United States Patent
Hoppe et al.

(10) Patent No.: US 11,667,183 B2
(45) Date of Patent: *Jun. 6, 2023

(54) DRIVE SYSTEM FOR HYBRID MOTOR VEHICLE WITH CONVERTIBLE DIRECT THROUGH-DRIVE FOR A WHEEL, AND MOTOR VEHICLE

(71) Applicant: Schaeffler Technologies AG & Co. KG, Herzogenaurach (DE)

(72) Inventors: Marcus Hoppe, Achern (DE); Torsten Pieper, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 19 days.

This patent is subject to a terminal disclaimer.

(21) Appl. No.: 17/598,942

(22) PCT Filed: Feb. 25, 2020

(86) PCT No.: PCT/DE2020/100132
§ 371 (c)(1),
(2) Date: Sep. 28, 2021

(87) PCT Pub. No.: WO2020/211892
PCT Pub. Date: Oct. 22, 2020

(65) Prior Publication Data
US 2022/0176801 A1 Jun. 9, 2022
US 2022/0176801 A1 Jun. 9, 2022

(30) Foreign Application Priority Data
Apr. 16, 2019 (DE) ...................... 10 2019 110 046.1
Nov. 26, 2019 (DE) ...................... 10 2019 131 956.0

(51) Int. Cl.
*B60K 6/40* (2007.10)
*B60K 6/44* (2007.10)
(Continued)

(52) U.S. Cl.
CPC ................ *B60K 6/44* (2013.01); *B60K 6/365* (2013.01); *B60K 6/387* (2013.01); *B60K 6/40* (2013.01);
(Continued)

(58) Field of Classification Search
CPC ......... F16H 2037/047; F16H 2037/048; B60K 6/44; B60K 6/365; B60K 6/387; B60K 6/40; B60K 6/36; B60Y 2400/73
(Continued)

(56) References Cited

U.S. PATENT DOCUMENTS

| 2003/0100395 A1* | 5/2003 | Hiraiwa | B60K 6/445 903/910 |
| 2018/0320783 A1* | 11/2018 | Lindström | B60W 30/18 |
| 2022/0176797 A1* | 6/2022 | Hoppe | B60K 20/02 |

FOREIGN PATENT DOCUMENTS

| DE | 102011085110 | 4/2013 |
| DE | 102016220512 | 4/2018 |

(Continued)

OTHER PUBLICATIONS

English Translation of DE102016220512A1; http://translationportal.epo.org; Dec. 20, 2022 (Year: 2022).*

*Primary Examiner* — Roger L Pang
(74) *Attorney, Agent, or Firm* — Volpe Koenig

(57) ABSTRACT

A drive system for a hybrid motor vehicle with a motor shaft rotationally coupled to the output shaft of an internal combustion engine, a first and second electric motors with respective first and second rotor shafts arranged in a radially offset manner to each other, a drive part rotationally connected to the second rotor shaft and which can be rotationally connected to at least one wheel, and a transmission unit operatively installed between the motor shaft, the two rotor shafts, and the drive part. A shift device controls the shift position of the transmission unit such that the shift device (Continued)

rotationally connects the motor shaft to the first rotor shaft while the second rotor shaft is decoupled in a first shift position, the shift device rotationally connects the motor shaft both to the first and second rotor shafts in a second shift position, and the shift device rotationally connects the two rotor shafts together while the motor shaft is decoupled in a third shift position.

19 Claims, 6 Drawing Sheets

(51) Int. Cl.
    *B60K 6/365*     (2007.10)
    *B60K 6/387*     (2007.10)
    *B60K 6/547*     (2007.10)

(52) U.S. Cl.
    CPC ........... *B60K 6/547* (2013.01); *B60Y 2200/92* (2013.01); *B60Y 2400/73* (2013.01)

(58) Field of Classification Search
    USPC ..................................... 475/5, 343, 198, 204
    See application file for complete search history.

(56) References Cited

FOREIGN PATENT DOCUMENTS

| | | |
|---|---|---|
| DE | 102017206510 | 10/2018 |
| WO | 2004106096 | 12/2004 |

\* cited by examiner

|  | Combustor | Generator | Output |
|---|---|---|---|
| Series driving | ● | ● |  |
| Electric-powered driving from battery |  | ● | ● |
| Combustion-engine-powered driving | ● | ● | ● |
| Stationary charging | ● | ● |  |

Fig. 4

DRIVE SYSTEM FOR HYBRID MOTOR VEHICLE WITH CONVERTIBLE DIRECT THROUGH-DRIVE FOR A WHEEL, AND MOTOR VEHICLE

CROSS-REFERENCE TO RELATED APPLICATIONS

This application is the U.S. National Phase of PCT Appln. No. PCT/DE2020/100132, filed Feb. 25, 2020, which claims priority to DE 102019110046.1, filed Apr. 16, 2019, and DE 102019131956.0, filed Nov. 26, 2019, the entire disclosures of which are incorporated by reference herein.

TECHNICAL FIELD

The disclosure relates to a drive system for a hybrid motor vehicle, which is preferably embodied as a series hybrid drive. The drive system typically has two electric motors: a first electric motor used primarily as a generator and a second electric motor used primarily as a drive motor. The drive system also has a transmission unit that operatively connects an output shaft of an internal combustion engine, the electric motors, and an output-side drive part. The disclosure also relates to a motor vehicle comprising this drive system.

BACKGROUND

Generic drive systems have already long been known from the prior art. For example, DE 10 2017 206 510 A1 discloses a transmission structure for a series/parallel hybrid vehicle.

Drive systems with which a "series" hybrid can be implemented are therefore already known, in which a direct through-drive of the internal combustion engine to the drive wheels/wheels of the motor vehicle is carried out. However, embodiments known from the prior art often experience at least some of the following disadvantages. The top speed of the motor vehicle is limited by the drive systems known from the prior art. The corresponding vehicle can therefore usually only implement a top speed of approx. 180 km/h. These drive systems are hardly suitable or even unsuitable for more powerful engines and/or higher vehicle classes. Another disadvantage is that the existing transmission structure of the known drive system means that both electric motors rotate at top speed when the main drive is provided by the internal combustion engine. It follows that the electric motors generate relatively high drag losses at high driving speeds. This in turn means that a design compromise must be found between maximum rotation speed and maximum wheel torque with regard to the electric motors. This also means that only limited trailer operation is possible with the vehicle. In addition, the electric motors are usually coupled to the internal combustion engine with a gear ratio that is unfavorable for series operation. Another disadvantage in the known embodiments is that the two front electric motors are usually arranged axially in a row next to one another, which is problematic in the case of the front-transverse design of the internal combustion engine and especially in the case of small vehicles.

SUMMARY

Therefore, the object of the present disclosure is to eliminate the disadvantages known from the prior art and, in particular, to provide a drive system which has improved efficiency, allows journeys at high speeds, and is of compact design.

This is achieved by a drive system having one or more of the features disclosed herein. A drive system for a hybrid motor vehicle, such as a passenger car or truck, a bus or another utility vehicle, is therefore provided, which comprises a motor shaft which is rotationally coupled or can be rotationally coupled to an output shaft of an internal combustion engine, a first electric motor which has a first rotor shaft and which is operated as a generator in a main operating state, a second electric motor which has a second rotor shaft arranged in a radially offset manner to the first rotor shaft and which is operated as a drive motor in the main operating state, a drive part which is rotationally connected to the second rotor shaft and which can be rotationally connected to at least one wheel of the motor vehicle, and a transmission unit which can be shifted and which is operatively installed between the motor shaft, the two rotor shafts, and the drive part. In addition, a shift device which controls the shift position of the transmission unit is operatively installed between the motor shaft, a first gear, which is permanently rotationally coupled to the first rotor shaft, and a second gear, which is permanently rotationally coupled to the second rotor shaft via an additional planetary transmission stage, such that the shift device in a first shift position rotationally connects the motor shaft to the first rotor shaft while the second rotor shaft is rotationally decoupled from the motor shaft, in a second shift position rotationally connects the motor shaft both to the first rotor shaft as well as to the second rotor shaft, and in a third shift position rotationally connects the two rotor shafts together while the motor shaft is rotationally decoupled from the two rotor shafts.

The radial offset of the rotor shafts of the two electric motors enables a significantly more compact axial design of the drive system. The transmission unit also allows the ratios of the two electric motors to be selected independently of each other. In addition, optimized map matching between the internal combustion engine and the first electric motor, which mainly acts as a generator, is facilitated by a separate gear stage. The shift device provided continues to provide a system that allows the motor vehicle to be operated much more efficiently. Higher speeds, for example top speeds of 250 km/h, are also possible as a result. In addition, the second electric motor forming the traction motor/drive motor can be easily "ejected" at higher speeds to avoid drag losses. In addition, the second electric motor can easily be designed for the maximum wheel torque, wherein the wheel torque can also be configured for trailer operation.

Further advantageous embodiments are explained in more detail below.

If the two electric motors are radially offset from each other overall in relation to their rotor shafts, the axial design of the drive system is particularly compact.

Furthermore, it is advantageous if the planetary transmission stage is formed by a planetary sub-gear, of which a sun gear is permanently connected directly to the second rotor shaft, a planet carrier supporting several planet gears is connected to an intermediate gear which is in meshed engagement with the second gear, and a ring gear can be arranged/supported fixed to the vehicle frame by means of a brake device. This allows the second electric motor to be controlled intelligently.

If the drive part is preferably designed as an input gear of a differential transmission, the transmission unit is implemented in a particularly compact manner.

Therefore, the drive part advantageously has a toothing that is in direct meshed engagement with the second gear. Thus, a direct coupling of the drive part with the second gear is realized.

According to a further preferred embodiment, it is alternatively advantageous if the drive part has a toothing that is directly in meshed engagement with the intermediate gear that is rotationally coupled to the second rotor shaft, wherein the intermediate gear continues to be rotationally coupled to the second gear. The intermediate gear is preferably in direct meshed engagement with the drive part.

In this respect, it is particularly advantageous if the second electric motor is arranged with its rotor shaft radially between the motor shaft and the drive part. Accordingly, the second electric motor is also preferably located radially between the first rotor shaft and the drive part.

In this context, it has also been found to save installation space if the intermediate gear is supported relative to a housing via a rolling bearing, wherein the rolling bearing is inserted axially (preferably completely) into a hollow space of the intermediate gear radially within its toothing (which is in meshed engagement with the drive part and the second gear). The rolling bearing is further preferably supported on an axial projection of the housing.

It is also advantageous if the intermediate gear directly forms an integral component of the planet carrier of the planetary sub-gear.

Furthermore, it is advantageous if the shift device has a sliding sleeve, which is blocked in each shift position via a detent unit, and is displaceably received directly in the first gear. Thus, the shift device is intelligently integrated within the first gear.

It is also expedient if the sliding sleeve is permanently received in a rotationally fixed manner with the first gear in each shift position.

If the sliding sleeve has a first connection region that can be coupled to a first transmission region on the motor shaft and a second connection region that can be coupled to a second transmission region on the second gear, the shift device is simple and space-saving. This facilitates the assembly.

Furthermore, the disclosure relates to a (hybrid) motor vehicle comprising the drive system according to the disclosure according to at least one of the embodiments described above, wherein the drive part is rotationally coupled to the wheels of the motor vehicle.

A particularly efficient design of the motor vehicle is ensured if the internal combustion engine is arranged with its output shaft transverse to a longitudinal vehicle axis (of the motor vehicle) and/or the drive part is rotationally connected to wheels of a drive axle.

In other words, a structure for a hybrid vehicle is thus realized according to the disclosure by providing a series hybrid with direct drive to the wheels. An internal combustion engine is connected to a shift element (shift device) via a shaft (motor shaft). Further inputs/outputs of the shift element are coupled to a first gear and a second gear accordingly. The internal combustion engine can be coupled to a generator via the first gear and a third gear. The internal combustion engine can also be coupled to a differential or to the wheels of a motor vehicle via the second gear and another gear (drive part). An electric (drive) machine can in turn be coupled to the differential or to the wheels of the motor vehicle, wherein this coupling is implemented via a planetary gear train, another gear (intermediate gear), the second gear and the gear providing the drive part, using the second gear as an intermediate gear. The planetary gear train (planetary sub-gear) is coupled as follows: a ring gear is operated as a brake; a planet carrier is connected to the further gear referred to as an intermediate gear, and a sun gear is connected to the electric machine. Instead of the second gear, the further gear referred to as the intermediate gear can also be used as a connecting gear to the drive part.

BRIEF DESCRIPTION OF THE DRAWINGS

The disclosure will now be explained in more detail with reference to figures, in conjunction with which various exemplary embodiments are also shown.

In the Figures:

FIG. 4 shows a diagram to illustrate different operating states that can be provided by the drive systems of FIGS. 1 and 2.

DETAILED DESCRIPTION

The figures are only schematic in nature and serve only for understanding the disclosure. The same elements are provided with the same reference signs. The different features of the various exemplary embodiments can also be freely combined with one another in principle.

Figure 1:
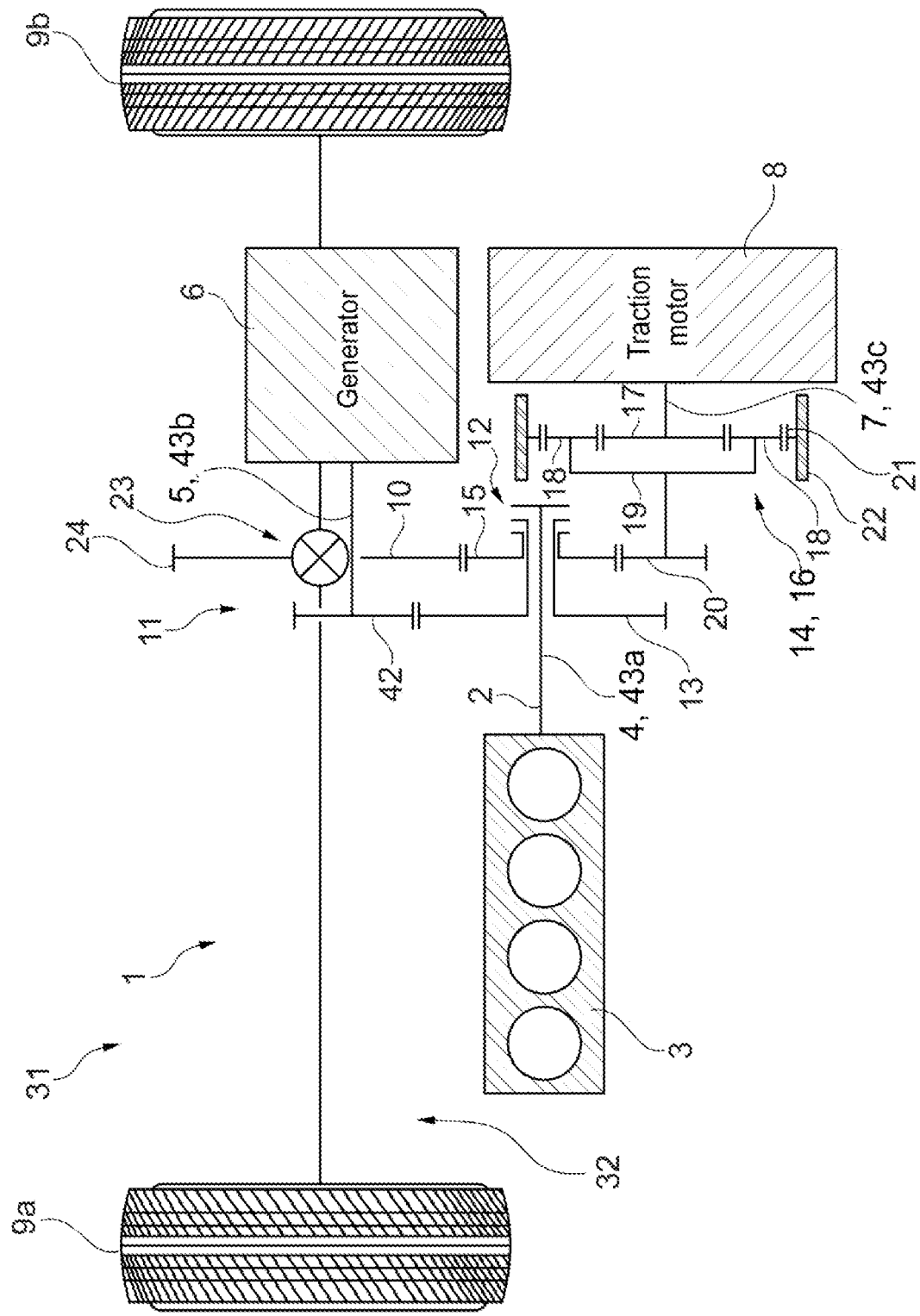
FIG. 1 shows a schematic sectional view of a drive system according to the disclosure in accordance with a first exemplary embodiment, in which the structure of a transmission unit coupling an internal combustion engine and two electric motors to a drive part of a differential gear can be clearly seen.

In conjunction with FIG. 1, a drive system 1 according to the disclosure—is first illustrated according to a preferred first exemplary embodiment. The drive system 1 is integrated in a hybrid motor vehicle, which is indicated by the reference sign 31. In particular, in this embodiment a drive axle 32 of the motor vehicle 31 (here a front axle, alternatively also a rear axle) is also shown, wherein wheels 9*a*, 9*b* of the drive axle 32 can be driven via various machines (internal combustion engine 3 and electric motors 6, 8) of the drive system 1. In this embodiment, an internal combustion engine 3 of the drive system 1 is located in a preferred front-transverse arrangement in which a longitudinal axis of the internal combustion engine 3, i.e. a (first) axis of rotation 43*a* of an output shaft 2 (crankshaft) of the internal combustion engine 3 is oriented transversely, in this case perpendicularly, to a longitudinal axis (vehicle longitudinal axis) of the motor vehicle 31.

According to the design of the drive system 1 as a series hybrid drive, the drive system 1 also has two electric motors 6, 8 in addition to the internal combustion engine 3. A first electric motor 6 is labeled "generator" in FIG. 1 and is thus used in a main operating state acting as a generator. However, the first electric motor 6 can, in principle, be connected as a drive motor, for example for purely electric reversing. A second electric motor 8, which consumes electric power generated by the first electric motor 6, is provided as a drive motor/traction motor.

The two electric motors 6, 8 are arranged with axes of rotation 43*b*, 43*c* of their rotor shafts 5, 7 offset from each other in the radial direction. The first electric motor 6 has a first rotor shaft 5 which is rotatably mounted about a (second) axis of rotation 43*b*. The second electric motor 8 has a second rotor shaft 7 which is rotatably mounted about a (third) axis of rotation 43*c*. The first electric motor 6 is arranged as a whole, i.e. also together with its stator, which is not shown here for the sake of clarity, and its rotor, which is arranged rotatably relative to the stator and is connected in a rotationally fixed manner to the first rotor shaft 5, offset in the radial direction of the second axis of rotation 43*b* relative to the entire second electric motor 8 together with its stator and its rotor, which is arranged rotatably relative to the stator and is connected in a rotationally fixed manner to the second rotor shaft 7. The two electric motors 6, 8 are also radially offset relative to the first axis of rotation 43*a* of the output shaft 2 of the internal combustion engine 3. Viewed along the longitudinal axis of the vehicle, the first axis of rotation 43*a* is located between the second axis of rotation 43*b* and the third axis of rotation 43*c*.

To convert the different operating states of the drive system 1 indicated in FIG. 4, a transmission unit 11 is provided between the internal combustion engine 3/the output shaft 2, the two electric motors 6, 8 with their two rotor shafts 5, 7, and a drive part 10 of the drive system 1. The transmission unit 11 is realized as a manual transmission and can be moved to different shift positions to implement the various operating states. The transmission unit 11 is controllable by a shift device 12, which is described in more detail below with reference to FIGS. 3, 5 and 6.

The transmission unit 11 has a centrally-arranged motor shaft 4 (also referred to in simplified terms as a shaft), which is coupled to the output shaft 2 in a rotationally fixed manner or is directly provided by a region of the output shaft 2. The motor shaft 4 is arranged coaxially with the output shaft 2 and thus rotatably about the common first axis of rotation 43*a*. The transmission unit 11 also has a first gear 13, which is permanently connected/coupled to the first rotor shaft 5 in a rotationally fixed manner. The first gear 13 is arranged coaxially with the motor shaft 4. The first gear 13 is designed as a hollow shaft gear and is rotatably mounted radially from the outside on the motor shaft 4. For the rotationally fixed connection/coupling of the first gear 13 with the first rotor shaft 5, a further (third) gear 42 is provided, which is arranged in a rotationally fixed manner on the first rotor shaft 5 and is in meshed engagement with the first gear 13. The third gear 42 is also considered to be part of the transmission unit 11.

Furthermore, the transmission unit 11 has a second gear 15, which serves for coupling to the second rotor shaft 7. The second gear 15 is arranged adjacently to the first gear 13 in the axial direction of the motor shaft 4, i.e. as viewed along the first axis of rotation 43*a*. The second gear 15 is also realized as a hollow shaft gear and is rotatably mounted radially from the outside on the motor shaft 4.

The second gear 15 is connected to a planetary transmission stage 14 via an intermediate gear 20. The planetary transmission stage 14 is further rotationally connected to the second rotor shaft 7. As can be seen from FIG. 1 in particular, the intermediate gear 20 meshing with the second gear 15 is directly connected in a rotationally fixed manner to a planet carrier 19 of the planetary transmission stage 14 forming a planetary sub-gear 16. The planetary sub-gear 16 of the transmission unit 11 also has a sun gear 17, which is directly connected to the second rotor shaft 7 in a rotationally fixed manner. Several planetary gears 18, which are distributed in the circumferential direction and rotatably mounted on the planet carrier 19, are in meshed engagement with the sun gear 17. A ring gear 21, which continues to mesh with the planet gears 18, cooperates with a brake device 22. The brake device 22 fixed to the housing, i.e. fixed to the vehicle frame, holds the ring gear 21 relative to a vehicle frame in its activated state. In its deactivated state, free rotation of the ring gear 21 with respect to the vehicle frame is enabled, so that the brake device 22 releases the ring gear 21 rotationally.

Moreover, in the first exemplary embodiment, the second gear 15 is in rotationally fixed connection/meshed engagement with the drive part 10. The drive part 10 has a toothing 24 with which the second gear 15 is in meshed engagement. The drive part 10 is designed here as an input gear of a differential gear 23 of the drive axle 32. Consequently, the drive part 10 is permanently further rotationally connected to the two wheels 9*a*, 9*b* of the motor vehicle 31 shown.

Figure 3:
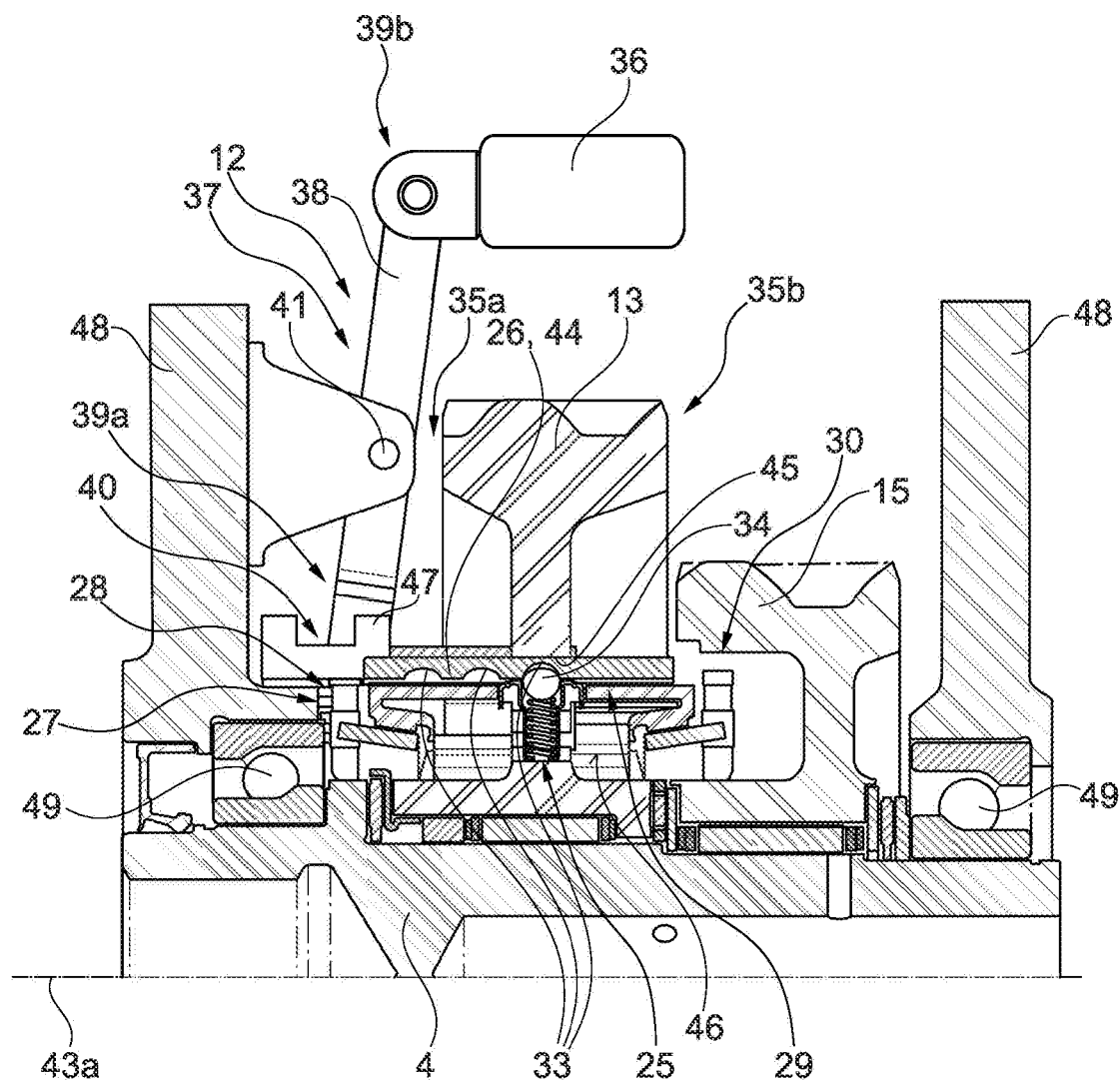
FIG. 3 shows a longitudinal sectional view of a shift device implemented in accordance with a preferred exemplary embodiment in the respective drive systems of FIGS. 1 and 2, wherein a sliding sleeve specifying the shift position of the shift device is located in a first displacement position, in which a central motor shaft is rotationally connected to a first gear coupled to a first electric motor.
Figure 5:
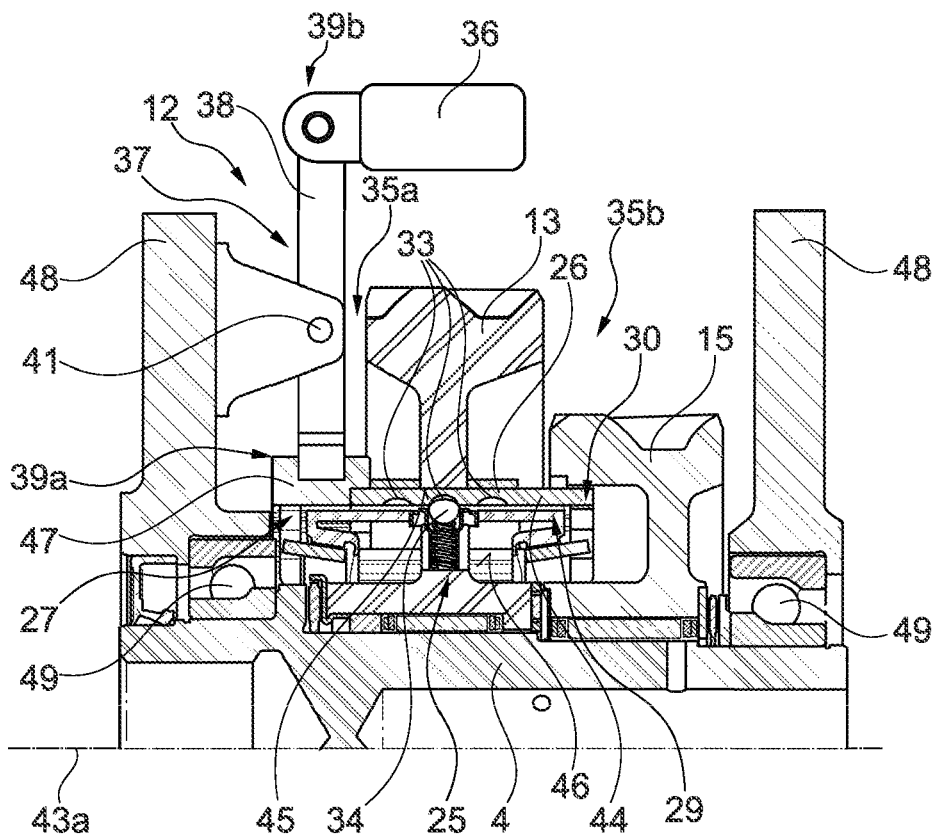
FIG. 5 shows a longitudinal sectional view of the shift device, similar to FIG. 3, wherein the sliding sleeve is in a second displacement position, which is changed compared to FIG. 3, in which second displacement position both the motor shaft and a second gear coupled to a second electric motor are rotationally connected to the first gear.
Figure 6:
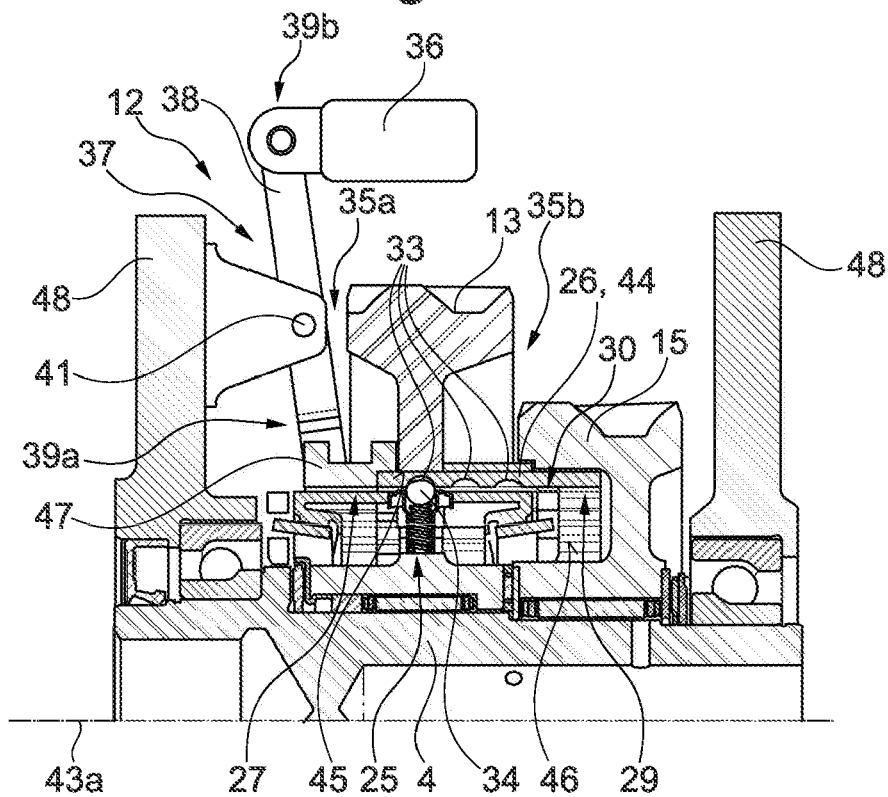
FIG. 6 shows a longitudinal sectional view of the shift device, similar to FIG. 3, wherein the sliding sleeve assumes a third displacement position, in which the motor shaft is rotationally decoupled from the first gear and the second gear as compared to FIG. 5.

According to the disclosure, the shift device 12 is operatively inserted between the motor shaft 4 and the two rotor shafts 5, 7, namely the two gears 13 and 15 coupled to the rotor shafts 5, 7. The shift device 12 shown in more detail in FIG. 3 is designed, in principle, in such a way that in its first shift position it rotationally couples/connects the motor shaft 4 to the first rotor shaft 5, while the second rotor shaft 7 is rotationally decoupled from the motor shaft 4 (as well as the first rotor shaft 5) (FIG. 3). In a second shift position of the shift device 12, the motor shaft 4 is rotationally connected/coupled to both the first rotor shaft 5 and the second rotor shaft 7 (FIG. 5). In a third shift position of the shift device 12, the two rotor shafts 5, 7 are rotationally connected/coupled to each other, while the motor shaft 4 is rotationally decoupled from the two rotor shafts 5, 7 (FIG. 6).

The shift device 12 is at least partially integrated directly in the first gear 13. The shift device 12 has a sliding sleeve 26 which is received in the first gear 13 so as to be axially displaceable along the central first axis of rotation 43*a*. By displacing this sliding sleeve 26 into different displacement positions, the different shift positions of the shift device 12 illustrated in FIGS. 3, 5 and 6 can be provided. The sliding sleeve 26 has a main body 44 that is displaceably received directly in a receiving hole 45 in the form of a through-hole within the first gear 13. The sliding sleeve 26 is also directly coupled to the first gear 13 in a rotationally fixed manner. The sliding sleeve 26 has an internal toothing 46 that interacts with various transmission regions 28, 30 on the motor shaft 4 and the second gear 15. In addition to the main body 44, the sliding sleeve 26 has a sliding part 47 associated therewith, which is connected to a first end 39*a* of a lever element 38. The sliding part 47 has a receiving contour 40 towards its radial outer side, in which the first end 39*a* engages in a form-fitting manner. The sliding part 47 is attached to the main body 44. The internal toothing 46, implemented as an axial toothing/serration, is introduced continuously in the sliding part 47 and the main body 44.

The lever element 38 is part of a lever mechanism 37, which is used to couple an actuator 36, provided as a linear motor, to the sliding sleeve 26. The lever element 38 is rotatably/pivotally supported on a housing 48 with respect to a pivot point 41. A second end 39*b* of the lever element 38 opposite the first end 39*a* is in direct operative relationship with the actuator 36. Thus, the sliding sleeve 26 is adjustable in its displacement position by the actuator 36.

The sliding sleeve 26 has a first connection region 27, which here is a first toothing region of the inner toothing 46. The first connection region 27 can be coupled in a form-fitting manner in the direction of rotation to a first transmission region 28 (also realized as a toothed region) on the part of the motor shaft 4. In the first shift position shown in FIG. 3 (corresponding to a first displacement position of the sliding sleeve 26), the motor shaft 4 is connected to the first gear 13 in a rotationally fixed manner by meshed engagement of the first transmission region 28 in the first connection region 27. FIG. 5 shows the second shift position of the shift device 12 (corresponding to a second displacement position of the sliding sleeve 26), in which both the first connection region 27 is connected to the first transmission region 28 in a rotationally fixed manner and a second connection region 29 (also realized as a toothing region) of the sliding sleeve 26 is located in a rotationally fixed manner with a second transmission region 30 (also realized as a toothing region) of the second gear 15. While the first connection region 27 is preferably realized by the sliding part 47, the second connection region 29 is preferably realized directly by the main body 44. According to the third shift position of the shift device 12 shown in FIG. 6 (corresponding to a third displacement position of the sliding sleeve 26), the two gears 13 and 15 are finally connected to each other in a rotationally fixed manner, wherein the motor shaft 4 is rotationally decoupled from the first gear 13 and thus also from the second gear 15. Thus, the sliding sleeve 26 with its first connection region 27 is out of meshed engagement with the first transmission region 28.

In conjunction with FIGS. 3, 5 and 6, it can also be seen that a detent unit 25 is provided to support the sliding sleeve 26 in the particular displacement position. The detent unit 25 is also integrated in the first gear 13. The detent unit 25 has a detent element 34 that is radially displaceably arranged in the first gear 13 and cooperates with a detent contour 33 in the sliding sleeve 26. The detent element 34 supports the sliding sleeve 26 in its particular displacement position in a displacement-resistant manner relative to the first gear 13.

As also shown in FIGS. 3, 5 and 6, in the embodiments the motor shaft 4 is rotatably mounted relative to the housing 48 in a typical manner. Between two support bearings 49, on which the motor shaft 4 is supported relative to the housing 48, the two first and second gears 13, 15 are mounted on the outside of the motor shaft 4 so as to be relatively rotatable. The second gear 15/the second transmission region 30 is located on a second axial side 35*b* of the first gear 13, facing away from the first transmission region 28 arranged towards a first axial side 35*a*.

Thus, according to the disclosure, the operating states illustrated in FIG. 4 can be realized by the drive system 1. In FIG. 4, "combustor" generally refers to the motor shaft 4 coupled to the internal combustion engine 3, "generator" refers to the first gear 13, and "output" refers to the second gear 15. In a typical series driving mode (in the first shift position of the shift device 12), the internal combustion engine 3 drives the first electric motor 6, which in turn electrically supplies the second electric motor 8 with drive energy. The second electric motor 8 applies torque to the wheels 9*a*, 9*b*. The first electric motor 6 is used to generate a corresponding electrical energy, which is temporarily stored in a battery. An electric driving state with the internal combustion engine 3 decoupled (according to the third shift position of the shift device 12) is performed by operating the second electric motor 8 (with an electric power from the battery). An internal combustion engine or hybrid driving typically occurs in the second shift position of the shift device 12, in that both the internal combustion engine 3, the first electric motor 6 and the second electric motor 8 are coupled to the first gear 13. A stationary charging typically also takes place in the first shift position.

Figure 2:
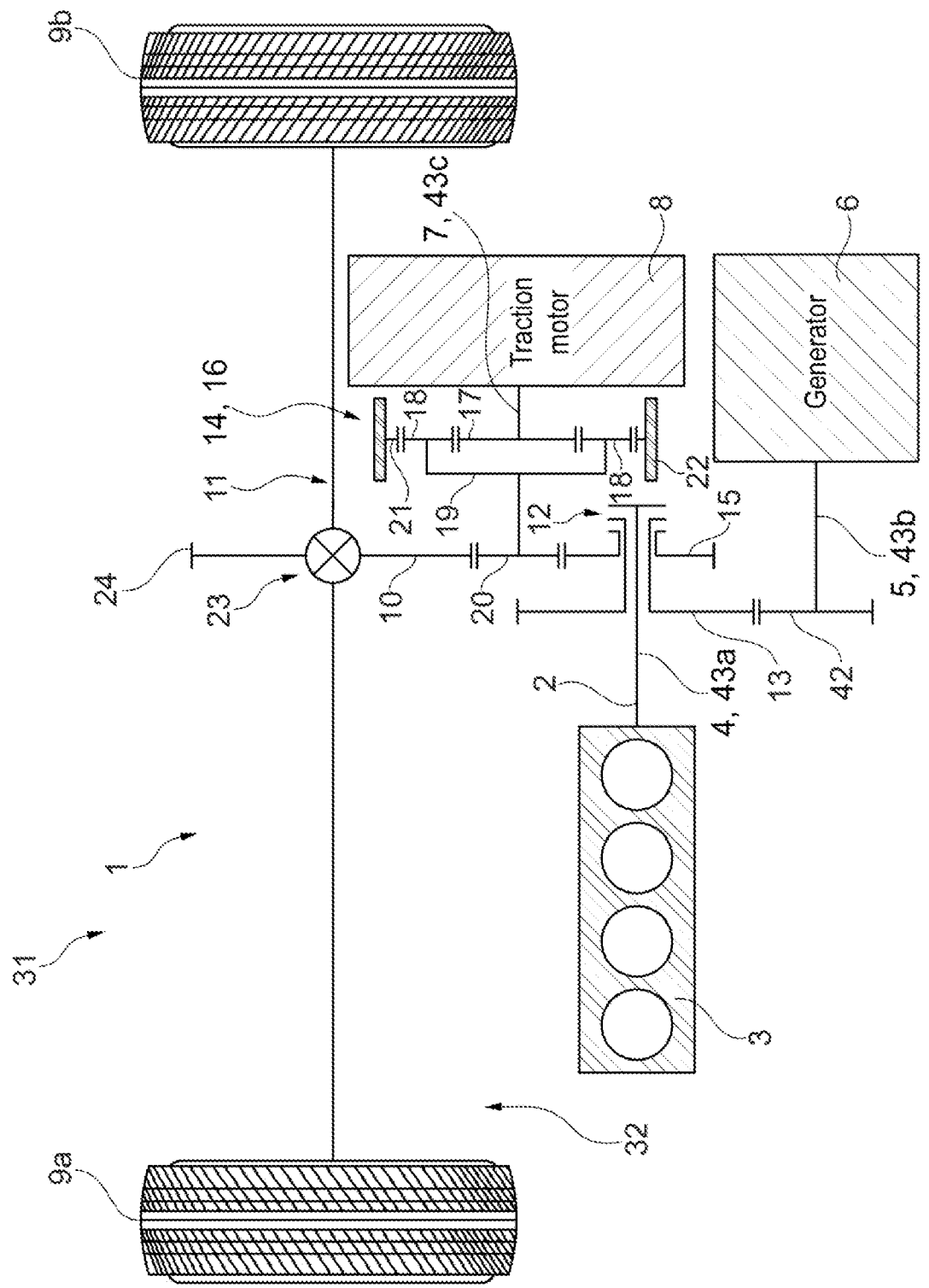
FIG. 2 shows a schematic sectional view of a drive system according to the disclosure in accordance with a second exemplary embodiment, which differs from the first exemplary embodiment substantially in the arrangement of an intermediate gear coupled to a second electric motor.

In conjunction with FIG. 2, a second embodiment according to the disclosure is shown, which is provided essentially according to the first exemplary embodiment. For the sake of brevity, therefore, only the differences between these two exemplary embodiments will be discussed. As can be seen in FIG. 2, the second gear 15 is now no longer in direct meshed engagement with the drive part 10, but is in indirect rotary connection with the drive part 10 via the intermediate gear 20.

Figure 7:
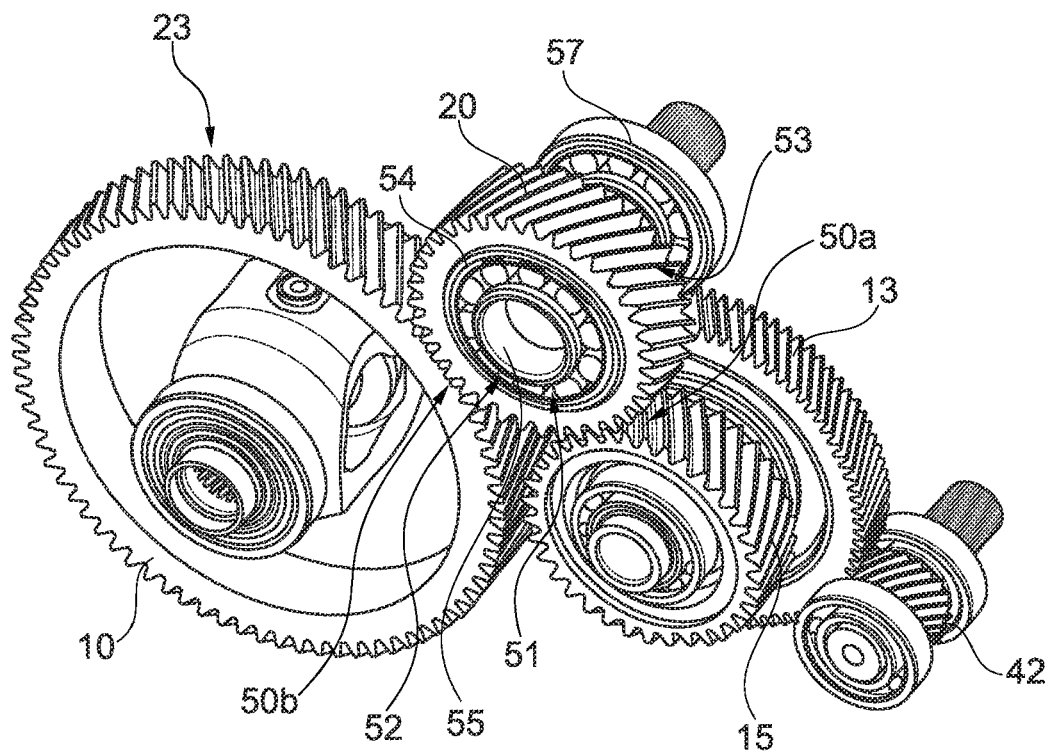
FIG. 7 shows a perspective view of a gear train used in the second exemplary embodiment according to FIG. 2, in which the drive part, the intermediate gear, the first gear, the second gear and the third gear are shown in meshed engagement with each other.

Consequently, the intermediate gear 20 is now in direct meshed engagement with the drive part 10 as well as the second gear 15. In this connection, reference should also be made to FIGS. 7 and 8, which show the closer connection of the intermediate gear 20. FIG. 7 shows that the intermediate gear 20 has two gear meshing regions 50*a*, 50*b* (of its toothing 53) that are circumferentially offset from each other. A first gear meshing region 50*a* is in meshed engagement with the second gear 15 on the motor shaft side. A second gear meshing region 50*b* is in meshed engagement with the drive part 10. The mutually differing diameters of the drive part 10 and the second gear 15 result in different loads on the two gear meshing regions 50*a*, 50*b* during operation. In particular, in an operating state (second shift position) in which the internal combustion engine 3 is activated and drives the generator/first electric motor 6 and the second electric motor 8 drives the intermediate gear 20 via the planetary sub-gear 16, a high torque is transmitted to the tooth flanks of the corresponding gear meshing region 50*a*, 50*b*. In the third shift position, the second gear 15 typically rotates load-free (/generates only drag torque), so that a drive torque is transmitted only via the second gear meshing region 50*b*.

In other words, the intermediate gear 20 forms a drive pinion with two gear meshing regions 50*a*, 50*b*. As mentioned above, the intermediate gear 20 is directly coupled to the second electric motor 8 acting as a traction motor. The intermediate gear 20 is therefore located centrally/inside between two spaced-apart gears (drive part 10 and second gear 15) when viewed along a gear train.

Figure 8:
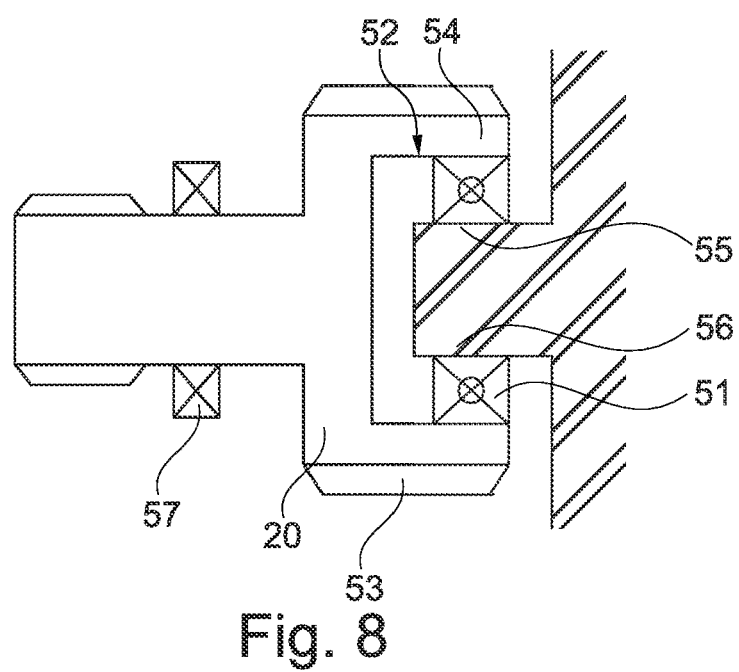
FIG. 8 shows a more detailed longitudinal sectional view of a bearing region between the intermediate gear shown in FIG. 7 and a housing.

In conjunction with FIG. 8, a preferred mounting of the intermediate gear 20 together with the planet carrier 19, which is connected thereto in a rotationally fixed manner, on the housing 48 (transmission housing) is also illustrated. The intermediate gear 20 is mounted for rotation relative to this housing 48 via a first rolling bearing 51. The intermediate gear 20 has a hollow space 52, which is located radially inside its toothing 53 and in which the first rolling bearing 51 is inserted/received. It has been found to be a compact solution if a bearing outer ring 54 of the first rolling bearing 51 is formed as an integral part of the intermediate gear 20. In this embodiment, a bearing inner ring 55 of the first rolling bearing 51 is even directly formed as an integral protrusion 56 of the housing 48. Alternatively, in further embodiments, the protrusion 56 is replaced by an element formed separately from the housing 48, such as a region of a threaded bolt projecting from the housing 48.

In further embodiments, as shown in FIG. 7, the bearing outer ring 54 is formed separately from the intermediate gear 20 and is connected to the intermediate gear 20 radially from the inside, radially within the hollow space 52. Accordingly, the bearing inner ring 55 is also formed separately from the housing 48 and is fixed to the protrusion 56.

In addition, it can be seen from FIG. 8 that the intermediate gear 20 is an integral part of a shaft further connected to the planet carrier 19. Axially offset from the first rolling bearing 51, another second rolling bearing 57 is mounted on this shaft.

The two electric motors 6, 8 are now also arranged in opposite directions with respect to the first axis of rotation 43a as compared to FIG. 2, wherein the second electric motor 8 together with the planetary sub-gear 16 are arranged closer to the drive axle 32 than the first electric motor 6.

In other words, the following advantages are achieved by the drive system 1 according to the disclosure: A design for a top speed of 250 km/h is possible. Disengagement of the traction motor 8 at higher speeds to reduce drag losses is possible. It is possible to design the traction motor 8 for maximum wheel torque and disengagement at higher speeds. The maximum wheel torque can also be designed for trailer operation. Due to the axis-parallel arrangement of the electric motors 6, 8 in the transmission structure 11 according to the disclosure, the gear ratios of the two electric motors 6, 8 are independent of each other, which means that the gear ratio from the combustor 3 to the generator 6 can be freely selected and is no longer coupled to the gear ratio between the combustor 3 and the final drive 10. This makes optimized map matching between the combustor 3 and generator 6 much easier due to the separate gear stage; 7. The electric motors 6, 8 are arranged axially parallel instead of coaxially behind each other, which facilitates decoupling of one of the two electric motors 6, 8. Depending on the use of the electric motors 6, 8 (large vs. small diameter or axially long vs. short design), significant installation space advantages can also be achieved as a result, especially for front-transverse designs in small vehicles. Another advantage is the electric boost mode, in which drive is possible via both electric motors 6, 8 without a combustor 3.

In a preferred embodiment, the internal combustion engine 3 (ICE) is connected to the shift element 12 (shift device) via a shaft 4. Two further inputs or outputs of the shift element 12 are connected to the gears 13 and 15, respectively. The ICE 3 can be coupled to the generator 6 via the gear 13 and the gear 42. The ICE 3 can be coupled to the differential 23, i.e. the wheels 9a, 9b, via the gears 15 and 10. The traction motor 8 can be coupled to the differential 23, i.e. the wheels 9a, 9b, via the planetary gear set 14 and the gears 20, 15 and 10. Here, the gear 15 serves as an intermediate gear. The planetary gear set 14 is connected as follows: Ring gear 21: brake 22 (fixed against); Planet carrier 19: gear 20; Sun gear 17: traction motor 8. In series driving mode, the ICE 3 is connected to the generator 6, which in turn is electrically connected to the traction motor 8. As described above, this drives the wheels 9a, 9b via the planetary gear set 14 and the gears 20, 15, 10. This operating state is possible for forward and reverse travel. Reversing is also possible via a battery-only mode. Here, the generator 6 serves as an additional "traction motor" and is connected to the wheels 9a, 9b via the gears 42, 13, 15 and 10. At the same time, the traction motor 8 is connected to the wheels 9a, 9b via the planetary gear set 14 and the gears 13, 15 and 10. The ICE 3 is not connected to the wheels 9a, 9b in this operating state (ICE 3 is either switched off or running in idle mode). In combustion mode, the ICE 3 is connected to the wheels 9a, 9b via the shift element 12 with the gears 15 and 10. In this case, the traction motor 8 is also connected to the wheels 9a, 9b via the gear 20 and the planetary transmission stage 14, but can be disconnected at any speed by opening the brake 22. A further operating state is stationary charging. Here, as in series mode, the ICE is connected to the generator 6 via the gears 13 and 42 and generates electrical energy, which is stored in the battery.

FIG. 2 shows another embodiment of the hybrid structure 1. In this case, the gear 20 serves as the intermediate gear and not gear 15 as in FIG. 1. The functions described above can also all be provided with this structure.

LIST OF REFERENCE SIGNS

1 Drive system
2 Output shaft
3 Internal combustion engine
4 Motor shaft
5 First rotor shaft
6 First electric motor
7 Second rotor shaft
8 Second electric motor
9a First wheel
9b Second wheel
10 Drive part
11 Transmission unit
12 Shift device
13 First gear
14 Planetary transmission stage
15 Second gear
16 Planetary sub-gear
17 Sun gear
18 Planetary gear
19 Planet carrier
20 Intermediate gear
21 Ring gear
22 Brake device
23 Differential gear
24 Toothing
25 Detent unit
26 Sliding sleeve
27 First connection region
28 First transmission region
29 Second connection region
30 Second transmission region
31 Motor vehicle
32 Drive axle
33 Detent contour
34 Detent element
35a First side
35b Second side
36 Actuator
37 Lever mechanism
38 Lever element
39a First end 39b Second end
40 Receiving contour
41 Pivot point
42 Third gear
43a First axis of rotation
43b Second axis of rotation
43c Third axis of rotation
44 Main body
45 Receiving hole
46 Internal toothing
47 Sliding part
48 Housing
49 Support bearing
50a First tooth engagement region
50b Second tooth engagement region
51 First roller bearing
52 Hollow space
53 Toothing
54 Bearing outer ring
55 Bearing inner ring
56 Projection
57 Second roller bearing

The invention claimed is:

1. A drive system for a hybrid motor vehicle, the drive system comprising:
a motor shaft which is rotationally coupled or rotationally couplable to an output shaft of an internal combustion engine;
a first electric motor which has a first rotor shaft and which is operated as a generator in a main operating state;
a second electric motor which has a second rotor shaft arranged in a radially offset manner to the first rotor shaft and which is operated as a drive motor in the main operating state;
a drive part rotationally connected to the second rotor shaft and which is rotationally connectable to at least one wheel of the motor vehicle;
a transmission unit is configured to be shifted and which is operatively installed between the motor shaft, the two rotor shafts, and the drive part;
a shift device which controls a shift position of the transmission unit being operatively installed between the motor shaft, a first gear, which is permanently rotationally coupled to the first rotor shaft, and a second gear, which is permanently rotationally coupled to the second rotor shaft via an additional planetary transmission stage, such that the shift device in a first shift position rotationally connects the motor shaft to the first rotor shaft while the second rotor shaft is rotationally decoupled from the motor shaft, in a second shift position rotationally connects the motor shaft both to the first rotor shaft as well as to the second rotor shaft, and in a third shift position rotationally connects the two rotor shafts together while the motor shaft is rotationally decoupled from the two rotor shafts.

2. The drive system according to claim 1, wherein the additional planetary transmission stage is formed by a planetary sub-gear, of which planetary sub-gear a sun gear is permanently connected directly to the second rotor shaft, a planet carrier supporting several planet gears is connected to an intermediate gear which is in meshed engagement with the second gear, and a ring gear is configured to be fixed to the vehicle frame by a brake device.

3. The drive system according to claim 1, wherein the drive part comprises an input gear of a differential gear.

4. The drive system according to claim 1, wherein the drive part has a toothing that is in direct meshed engagement with the second gear.

5. The drive system according to claim 2, wherein the drive part has a toothing that is in direct meshed engagement with the intermediate gear rotationally coupled to the second rotor shaft, and the intermediate gear is also rotationally coupled to the second gear.

6. The drive system according to claim 1, wherein the shift device has a sliding sleeve that is blocked in each shift position via a detent unit and is displaceably received directly in the first gear.

7. The drive system according to claim 6, wherein the sliding sleeve is permanently received in a rotationally fixed manner with the first gear in each shift of the positions.

8. The drive system according to claim 6, wherein the sliding sleeve has a first connection region which is couplable to a first transmission region on the motor shaft and a second connection region which is couplable to a second transmission region on the second gear.

9. A motor vehicle comprising the drive system according to claim 1, wherein the drive part is rotationally coupled to wheels of the motor vehicle.

10. The motor vehicle according to claim 9, wherein the internal combustion engine is arranged with the output shaft thereof transverse to a vehicle longitudinal axis.

11. The motor vehicle according to claim 9, wherein the drive part is rotationally connected to wheels of a drive axle.

12. A drive system for a hybrid motor vehicle, the drive system comprising:
a motor shaft configured to be rotationally coupled to an output shaft of an internal combustion engine;
a first electric motor which has a first rotor shaft;
a second electric motor which has a second rotor shaft arranged in a radially offset manner to the first rotor shaft;
a drive part rotationally connected to the second rotor shaft and which is rotationally connectable to at least one wheel of the motor vehicle;
a transmission unit is configured to be shifted operatively installed between the motor shaft, the two rotor shafts, and the drive part;
a shift device which controls a shift position of the transmission unit being operatively installed between the motor shaft, a first gear, which is permanently rotationally coupled to the first rotor shaft, and a second gear, which is permanently rotationally coupled to the second rotor shaft via an additional planetary transmission stage, such that the shift device in a first shift position rotationally connects the motor shaft to the first rotor shaft while the second rotor shaft is rotationally decoupled from the motor shaft, in a second shift position rotationally connects the motor shaft both to the first rotor shaft as well as to the second rotor shaft, and in a third shift position rotationally connects the two rotor shafts together while the motor shaft is rotationally decoupled from the two rotor shafts.

13. The drive system according to claim 12, wherein the additional planetary transmission stage is formed by a planetary sub-gear, of which planetary sub-gear a sun gear is permanently connected directly to the second rotor shaft, a planet carrier supporting several planet gears is connected to an intermediate gear which is in meshed engagement with the second gear, and a ring gear is configured to be fixed to the vehicle frame by a brake.

14. The drive system according to claim 13, wherein the drive part comprises an input gear of a differential gear.

15. The drive system according to claim 12, wherein the drive part has a toothing that is in direct meshed engagement with the second gear.

16. The drive system according to claim 13, wherein the drive part has a toothing that is in direct meshed engagement with the intermediate gear rotationally coupled to the second rotor shaft, and the intermediate gear is also rotationally coupled to the second gear.

17. The drive system according to claim 12, wherein the shift device has a sliding sleeve that is blocked in each shift position via a detent unit and is displaceably received directly in the first gear.

18. The drive system according to claim 17, wherein the sliding sleeve is permanently received in a rotationally fixed manner with the first gear in each shift of the positions.

19. The drive system according to claim 17, wherein the sliding sleeve has a first connection region which is couplable to a first transmission region on the motor shaft and a second connection region which is couplable to a second transmission region on the second gear.

\* \* \* \* \*